United States Patent

Miyazaki (10) Patent No.: US 9,373,270 B2
(45) Date of Patent: Jun. 21, 2016

(54) PELVIC SURGERY TRAINING MODEL

(76) Inventor: Douglas Wayne Miyazaki, Winston-Salem, NC (US)

( * ) Notice: Subject to any disclaimer, the term of this patent is extended or adjusted under 35 U.S.C. 154(b) by 422 days.

(21) Appl. No.: 12/904,623

(22) Filed: Oct. 14, 2010

(65) Prior Publication Data

US 2011/0091855 A1 Apr. 21, 2011
US 2011/0269109 A2 Nov. 3, 2011

Related U.S. Application Data

(60) Provisional application No. 61/251,818, filed on Oct. 15, 2009.

(51) Int. Cl.
*G09B 23/28* (2006.01)
*G09B 23/34* (2006.01)

(52) U.S. Cl.
CPC .............. *G09B 23/281* (2013.01); *G09B 23/34* (2013.01)

(58) Field of Classification Search
USPC .......................... 434/267, 268, 272, 273, 274
See application file for complete search history.

(56) References Cited

U.S. PATENT DOCUMENTS

| | | | |
|---|---|---|---|
| 2,324,702 A | 7/1943 | Hoffman et al. | |
| 2,495,568 A | 1/1950 | Kanning et al. | |
| 2,572,454 A * | 10/1951 | Down et al. | 40/506 |
| 2,763,070 A * | 9/1956 | McCormick | 434/273 |
| 3,303,582 A * | 2/1967 | Farquhar | 434/288 |
| 3,863,363 A * | 2/1975 | Miyajima | 434/286 |
| 3,921,311 A * | 11/1975 | Beasley et al. | 434/273 |
| 4,278,223 A * | 7/1981 | Fauteux | 248/125.8 |
| 4,288,222 A * | 9/1981 | Kling | 434/272 |
| 4,433,961 A | 2/1984 | Chandler | |
| 4,439,162 A * | 3/1984 | Blaine | 434/268 |
| 4,588,384 A * | 5/1986 | Shiba | 434/286 |
| 4,734,039 A * | 3/1988 | Thompson | 434/274 |
| 4,752,228 A * | 6/1988 | Masunaga | 434/131 |
| 4,773,865 A | 9/1988 | Baldwin | |
| 4,789,340 A | 12/1988 | Zikria | |
| 5,061,187 A * | 10/1991 | Jerath | 434/262 |
| 5,104,328 A | 4/1992 | Lounsbury | |
| 5,403,191 A | 4/1995 | Tuason | |
| 5,472,345 A * | 12/1995 | Eggert | 434/273 |

(Continued)

OTHER PUBLICATIONS

"International Application Serial No. PCT/CN2009/072534, International Preliminary Report on Patentability completed Sep. 30, 2010", (w/ English Translation), 17 pgs.

(Continued)

*Primary Examiner* — Melba Bumgarner
*Assistant Examiner* — Joseph B Baldori
(74) *Attorney, Agent, or Firm* — Kilpatrick Townsend & Stockton LLP (57) ABSTRACT

A male or female human pelvic model for teaching, practicing, or evaluating proficiency in physical examination, medical or surgical techniques, or procedures involving the pelvis are disclosed. The pelvic model can include replaceable pelvic skeletal frame and normal, pathological, or other modules providing 3D anatomical representations of various body components, such as skin, organs, muscles, vessels, connective tissues, ligaments, tendons, or nerves. The pelvic model can include portions that can retain pressurized fluid, such as to mimic a body organ, cavity, or vessel that retains fluid, so that leakage can occur, such as upon unintended cutting or puncture. A rotating open-top pelvic region structure can permit viewing or video capture during the simulated procedure.

27 Claims, 6 Drawing Sheets

(56) References Cited

U.S. PATENT DOCUMENTS

| | | | |
|---|---|---|---|
| 5,518,407 A | | 5/1996 | Greenfield et al. |
| 5,775,916 A | | 7/1998 | Cooper et al. |
| 6,029,826 A | * | 2/2000 | Clay .............................. 211/14 |
| 6,062,866 A | | 5/2000 | Prom |
| 6,336,812 B1 | | 1/2002 | Cooper et al. |
| 6,428,323 B1 | | 8/2002 | Pugh |
| 6,503,087 B1 | | 1/2003 | Eggert |
| 6,780,016 B1 | | 8/2004 | Toly |
| 7,080,984 B1 | | 7/2006 | Cohen |
| 7,241,145 B2 | | 7/2007 | Riener et al. |
| 7,465,168 B2 | | 12/2008 | Allen et al. |
| 7,553,159 B1 | | 6/2009 | Arnal et al. |
| 7,632,100 B2 | | 12/2009 | Allen et al. |
| 7,648,367 B1 | | 1/2010 | Makower et al. |
| 2005/0214727 A1 | | 9/2005 | Stoianovici et al. |
| 2006/0073456 A1 | | 4/2006 | Allen et al. |
| 2007/0166681 A1 | | 7/2007 | Hemphill et al. |
| 2008/0131855 A1 | | 6/2008 | Eggert et al. |
| 2008/0138778 A1 | | 6/2008 | Eggert et al. |
| 2008/0138779 A1 | | 6/2008 | Eggert et al. |
| 2008/0138780 A1 | | 6/2008 | Eggert et al. |
| 2009/0208915 A1 | | 8/2009 | Pugh |
| 2010/0086906 A1 | | 4/2010 | Allen et al. |

OTHER PUBLICATIONS

"International Application Serial No. PCT/CN2009/072534, Written Opinion mailed Oct. 15, 2009", (w/ English Translation), 10 pgs.

Saulter, F., et al., "N-Substituted 2-methyl-3-aminoacetylbenzol[b]thiothene and 2-methyl-3-(α-hydroxyl-β-aminoethyl)benzo[b]thiophen.", (Abstract No. 12797g), *Chemical Abstracts*, 68(3), (Jan. 15, 1968), p. 1219.

"International Application Serial No. PCT/US2010/002743, Search Report mailed Jan. 31, 2011", 5 pgs.

"International Application Serial No. PCT/US2010/002743, Written Opinion mailed Jan. 31, 2011", 6 pgs.

Gardner, R, "Simulation in Obstetrics and Gynecology", obstetrics and gynecology clinics of north america 35(1), (Mar. 2008), 97-127.

"Advanced Surgical Uterus, Part #60287", [online]. © Copyright 2010 Limbs & Things Ltd. [retrieved Jul. 22, 2010], Retrieved from the Internet: <URL: http://www.golimbs.com/products.php?id=60287>, 1 pg.

"Helix Connectors (Pack of 10), Part #90100", [online]. © Copyright 2010 Limbs & Things Ltd. [retrieved Jul. 22, 2010]. Retrieved from the Internet: <URL: http://www.golimbs.com/products.php?id=90100>, 1 pg.

"Surgical Female Pelvic Trainer (SFPT) with Advanced Surgical Uterus, Part #60283", [online]. © Copyright 2010 Limbs & Things Ltd. [retrieved Jul. 22, 2010], Retrieved from the Internet: <URL: http://www.golimbs.com/products.php?id=60283>, 1 pg.

Moen. M. D. et al. "Natural orifice hysterectomy". International Urogynecology Journal, 19(9), (2008), 1189-1192.

Semm, K,, "Pelvi-Trainer, ein Obungsgeratfurdie operative Pelviskopie zum Erleren endoskopischer Ligatur und Nahttechniken [Pelvi-trainer, a training device in operative pelviscopy for teaching endoscopic ligation and sulture technics]", (w/ English Abstract), Geburtshilfe und Frauenheilkunde. 46(1). (1986), 60-62.

Tu. F. F. et al. "Route of Hysterectomy Influence and Teaching Hospital Status". Obstetrics & Gynecology. 114(1). (2009), 1374-1375.

\* cited by examiner

PELVIC SURGERY TRAINING MODEL

CLAIM OF PRIORITY

This non-provisional patent application claims the benefit of priority under 35 U.S.C. §119(e) of U.S. Provisional Patent Application Ser. No. 61/251,818, filed on Oct. 15, 2009 and entitled "PELVIC SURGERY MODEL", which is herein incorporated by reference in its entirety.

TECHNICAL FIELD

This patent document relates to apparatuses and methods for teaching surgical and other medical procedures. More particularly, but not by way of limitation, this patent document relates to apparatuses, methods, or kits for teaching, practicing, or evaluating physician competency in various surgical and medical techniques involving the pelvis, or organs and tissues located therein.

BACKGROUND

Current methods of teaching pelvic surgery include the study of surgical procedures, viewing videos of surgeries, and observing and assisting in live surgeries under the instruction of a skilled surgeon. The current "hands on" apprenticeship method of teaching surgery and the philosophy of "see one, do one, teach one" can pose substantial risk to the live patient in the operating or surgical room. Furthermore, the need for an appropriate live patient or "teaching case" can limit physician training, and can expose physicians and teaching hospitals to potential malpractice suits and increased insurance premiums. More recently, due to the risks of malpractice suits, fewer qualified physicians are teaching surgical procedures, resulting in fewer physicians who are well-trained in surgical procedures.

Cadavers can also be used to teach surgical procedures, but cadavers are expensive and pose risks of disease transmission to or by the physician. The cost to provide a cadaver lab and the ancillary personnel to staff the lab and perform training makes it unfeasible for many hospitals. As a result, these physicians may be required to travel to cadaver seminars thereby increasing the costs associated with cadaver training. For religious and cultural reasons, some physicians object to the use of cadavers to teach surgical procedures. Another drawback of using cadavers is that once a specific area of a cadaver has been operated on, the tissues are destroyed and cannot be used again to repeat the procedure. The application of preservatives, cooling, freezing or other methods to prevent decomposition of cadaver tissue can affect the feel, softness, firmness, consistency, or texture, so that the cadaver tissue does not mimic living tissue. Therefore, the cadaver operating experience does not truly mimic the experience of operating on a live patient.

Many surgeries must be performed without the benefit of an open surgical field, such that the physician is, to some extent, operating "blind". Such "blind" surgeries require the physician to manually palpate by touch the location and identification of various tissues, organs and landmarks in the surgical field in order that the physician may perform the surgical procedure on the proper tissue or organ. Recognizing true tactile differences (e.g., size, shape, density, softness/hardness, or surface features) among tissues help identify the appropriate site to perform aspects of the surgical procedure, and prevent inadvertent cutting of tissue or organs.

Applicant believes that that there is no commercially available pelvic surgery model capable of use in teaching, practicing and evaluating all basic and advanced pelvic surgeries, and in particular there is no model on which a surgeon can perform multiple complete surgical procedures from start to finish all on the same model. However, specific anatomical pelvic surgery models have been developed by manufacturers, such as American Medical Systems, Gynecare, Bard, Boston Scientific, in order to demonstrate highly or very specific surgical techniques using said manufacturer's surgical instruments or devices. Human anatomy models of the abdominopelvic region are also available for general study and teaching of general medical procedures and physical examinations, such as those offered by Gaumard Scientific and Limbs and Things, but it is believed that these models are not designed for or capable of demonstrating or practicing a vast majority of basic and advanced surgical procedures or techniques. The absence of substantially all major organs and tissues in these limited models, particularly those necessary for identifying landmarks or orienting the physician to reach the appropriate surgical sites, inhibits the ability to provide a realistic operating experience, and inhibits teaching of procedures to adapt or respond to surgical complications caused by the presence (or unintended cutting) of these ancillary tissues and organs. These existing models, organs and tissues are generally made of a hard or semi-rigid materials and plastics. This prevents teaching of tactile differences to identify various organs and tissues in the surgical field and thus does not permit a realistic operating experience. Furthermore, the tissues and organs of existing surgical models are not replaceable and the model cannot be used for multiple procedures, increasing the cost of physician training.

It is believed that there is currently no reusable, anatomically complete, interactive pelvic surgery model that realistically mimics live tissue and which is suitable for performing all current, basic and advanced pelvic surgical techniques. It is believed that there is no anatomically complete interactive surgery model suitable for teaching, practicing and evaluating in a single model human female pelvic surgical procedures and techniques, for example but not by way of limitation, vaginal hysterectomy, bilateral salpingo-oophorectomy, retropubic urethral sling procedures, transobuturator urethral sling procedures, new single incision mid-urethral sling procedures, bilateral sacrospinous ligament suspension/fixations, bladder injury repair, or rectal injury repair.

Overview

The present inventor has recognized, among other things, that there is a need for providing or improving a pelvic model that can be used to help train medical personnel in performing medical or surgical examinations or procedures. Accordingly, this document describes, among other things, an at least partially reusable pelvic model having body component model cartridges or modules representing various tissues or organs of the pelvic region, that are separable and interchangeably replaceable by an end-user within the human anatomical model housing. The present inventor has also recognized, among other things, that there is also a need for a pelvic surgery model housing having body component models representing all significant bones, organs, tissues, vasculature and nerves of the pelvic region that have a realistic life-like look, feel, softness/hardness, density, weight, elasticity, color or the like, so as to provide a realistic surgical experience for the teaching, practicing and evaluation of all pelvic surgical, medical and physical examination techniques and procedures.

Various examples of the present invention can incorporate inventive features that can address some or all of these problems or needs, such as described herein. As used herein, body components that represent or replicate the human male or female pelvic region can be referred to by the corresponding anatomic terms that such body components represent, whether in normal or abnormal form, as needed to provide the desired training (e.g., for convenience, the body component models for bone, skin, connective tissue, ligaments, organs, blood vessels, nerves, skeletal bones, or other tissues can be referred to herein by their respective anatomical terms).

In an example, an anatomical model of the pelvic region of a human body can be provided, such as to assist in teaching, practicing, or evaluating various examination, medical, or surgical procedures or techniques relating to the human pelvis. For example, human male or female pelvic anatomical models can be provided. In an example of a female pelvic anatomical model, surgeries that can be taught, practiced, or evaluated on such model can include, by way of example only and not by way of limitation, one or more of vaginal hysterectomy, bilateral salpingo-oophorectomy, retropubic urethral sling procedure, transobuturator urethral sling procedure, vaginal sacrpcolpopexy, single incision mid-urethral sling procedure, bilateral sacrospinous ligament suspension/fixation, vaginal injury repair, cervical injury repair, uterine injury repair, bladder injury repair, or rectal injury repair. In an example of a male pelvic anatomical model, surgeries that can be taught, practiced, or evaluated on such model can include by way of example only and not by way of limitation, male urethral sling, or prostatectomy.

In an example, an anatomical model of the pelvic region of a human body can include at least a portion of a relatively rigid pelvic skeletal frame or pelvic girdle attached to a pelvic model stand, and one or more models of various organs, muscles, nerves, ligaments, tendons, connective tissues, blood vessels, lymphatic tissues, membranes, cavities and skin that may be found in a human pelvic region (which may be generally referred to herein as "body component models"). Body component models of the present invention have elasticity, flexibility, density, softness/hardness, consistency, color, look and feel mimicking the particular human tissue which they represent.

A body component model may comprise an elastomer having a thickness, density, consistency, look and feel of human skin layers, soft tissues and fascia representing the human skin layers in the abdominopelvic region may encase at least portion the pelvic skeletal frame providing an external shape and appearance of the model that is substantially representative of the external appearance of the human abdominopelvic region. In certain examples, the top of the anatomical model or the anterior or posterior surfaces may be open to permit observation and video recording of the examination or medical surgical procedure being performed on the anatomical model.

The various embodiments of the pelvic model may include a pelvic model stand, comprising a base, a vertical member and a horizontal member. A portion of the pelvic skeletal frame of the pelvic model is attached to a horizontal member of the stand. In alternate embodiments, the vertical member may rotate to aid demonstration of the medical or surgical procedure. In still further embodiments, the horizontal member of the stand can pivot to allow rotation of the position of the pelvic anatomical model and thereby simulate various positions in which a live human may be oriented during an examination, medical or surgical procedure, such as in the lithotomy position, reverse lithotomy position, Trendelenburg position, prone position, or other desired positions.

To better illustrate the subject matter described herein, a non-limiting list of examples follows.

Example 1 describes subject matter that can include an anatomical model for demonstrating, practicing, or evaluating a human pelvic examination, medical, or surgical procedure or technique. The model can comprise a pelvic region structure, comprising three-dimensional (3D) anatomical representations of a pubic bone, a sacrum, a coccyx, and at least one of an ischium or an ilium. The model can also comprise a user-removable body component module, comprising a 3D anatomical representation of at least one of a human organ, gland, muscle group, nerve, vessel, ligament, tendon, connective tissue, or skin, the body component module configured to be directly or indirectly engaged in substantially correct anatomical relation to the pelvic region structure.

In Example 2, the subject matter of Example 1 can optionally include the anatomical model comprising a support structure, configured to support the pelvic region structure, and comprising a lockable pivot coupling, configured to removably couple at least a portion of the pelvic region structure to the support structure to allow pivoting of an exposed top region of the pelvic region structure to be viewed laterally by an observer.

In Example 3, the subject matter of any one of Examples 1 or 2 can optionally include the anatomical model wherein the pelvic region structure comprises at least three separately user-replaceable modules comprising: (1) an anterior module, including a 3D representation of a pubic region; (2) a posterior module, including a 3D representation of at least a portion of a sacrum; and (3) a medial module, including a 3D representations of a main bony pelvis including at least an iliac crest; and, wherein the anterior and posterior modules include respective couplings that are user-attachable and user-detachable from the medial module along respective specified non-anatomical interfaces.

In Example 4, the subject matter of any one of Examples 1-3 can optionally include the anatomical model, wherein: the anterior module comprises 3D representations of pubic symphysis, inferior pubic ramus, and superior pubic ramus; the medial module comprises 3D representations of an iliac crest, an ischial tuberosity, and first sacral vertebrae; and the posterior module comprises 3D representations of an ischial spine, second, third, fourth and fifth sacral vertebrae, and a coccyx.

In Example 5, the subject matter of any one of Examples 1-4 can optionally include the anatomical model comprising a bladder module, including a 3D representation of a bladder, the bladder module including a coupling that is user-attachable and user-detachable from at least one of the anterior module, the posterior module, or the medial module.

In Example 6, the subject matter of any one of Examples 1-5 can optionally include the anatomical model wherein bladder module includes: the 3D representation of the bladder including an elastic balloon, configured to be capable of retaining a fluid, and configured to simulate an anatomical size, shape, consistency, and feel; and a male or female sliding lock coupling, configured to engage a mating female or male sliding lock coupling of the anterior module.

In Example 7, the subject matter of any one of Examples 1-6 can optionally include the anatomical model wherein the 3D representation of the bladder comprises a valve capable of being closed such that the 3D representation of the bladder is capable of retaining at least some fluid.

In Example 8, the subject matter of any one of Examples 1-7 can optionally include the anatomical model wherein the bladder module includes at least one of: a 3D representation of a ureter, optionally configured to be capable of carrying a fluid, and configured to simulate an anatomical size, shape, consistency, and feel; or a 3D representation of a urethra, optionally configured to be capable of carrying a fluid, and configured to simulate an anatomical size, shape, consistency, and feel.

In Example 9, the subject matter of any one of Examples 1-8 can optionally include the anatomical model comprising a uterine module, including a 3D representation of a uterus, the uterine module including a coupling that is user-attachable and user-detachable from at least one of the anterior module, the posterior module, or the medial module.

In Example 10, the subject matter of any one of Examples 1-9 can optionally include the anatomical model, wherein the uterine module includes: a 3D representation of a uterine artery, optionally configured to be capable of carrying a fluid, and configured to simulate an anatomical size, shape, consistency, and feel; a male or female sliding lock coupling, configured to engage a mating female or male sliding lock coupling of the medial module; and wherein the 3D representation of the uterus is configured to simulate an anatomical size, shape, consistency, and feel.

In Example 11, the subject matter of any one of Examples 1-10 can optionally include the anatomical model comprising: a skin shell, comprising a 3D representation of a vulva, configured to simulate an anatomical size, shape, consistency, and feel; and a 3D representation of a vagina, configured to extend between the 3D representation of the vulva and including a cervical opening into the 3D representation of the uterus.

In Example 12, the subject matter of any one of Examples 1-11 can optionally include the anatomical model wherein the skin shell includes an opening sized and shaped to accommodate a pivot coupling between the medial module of the pelvic region structure and a support, wherein the medial module of the pelvic region structure is located within the skin shell and the support is located outside of the skin shell.

In Example 13, the subject matter of any one of Examples 1-12 can optionally comprise the anatomical model comprising a rectal module, including a 3D representation of a rectum, the rectal module including a coupling that is user-attachable and user-detachable from at least one of the anterior module, the posterior module, or the medial module.

In Example 14, the subject matter of any one of Examples 1-13 can optionally include the anatomical model wherein the rectal module includes: the 3D representation of the rectum, optionally configured to be capable of carrying a fluid, and configured to simulate an anatomical size, shape, consistency, and feel; and a male or female sliding lock coupling, configured to engage a mating female or male sliding lock coupling of the posterior module.

In Example 15, the subject matter of any one of Examples 1-14 can optionally include the anatomical model, wherein the body component module includes a 3D representation of a sacrospinous ligament.

In Example 16, the subject matter of any one of Examples 1-15 can optionally include the anatomical model wherein the body component module includes a 3D representation of at least one of a vagina, a cervix, a uterus, a fallopian tube, or an ovary.

In Example 17, the subject matter of any one of Examples 1-16 can optionally include the anatomical model wherein the body component module is configured to simulate a pathologic condition of a human body component represented by the body component module.

Example 18 can include, or can be combined with any one of Examples 1-17 to include, an anatomical model for demonstrating, practicing, or evaluating a human pelvic examination, medical, or surgical procedure or technique, the model comprising: a pelvic region structure, comprising three-dimensional (3D) anatomical representations of a pubic bone, a sacrum, a coccyx, and at least one of an ischium or an ilium; and a user-removable body component module, comprising a 3D anatomical representation of at least one of a human organ, gland, muscle group, nerve, vessel, ligament, tendon, connective tissue, or skin, the body component module configured to be directly or indirectly engaged in substantially correct anatomical relation to the pelvic region structure; and wherein the pelvic region structure comprises: at least three separately user-replaceable modules comprising: (1) an anterior module, including a 3D representation of a pubic region; (2) a posterior module, including a 3D representation of at least a portion of a sacrum; and (3) a medial module, including a 3D representations of a main bony pelvis including at least an iliac crest; and wherein the anterior and posterior modules include respective couplings that are user-attachable and user-detachable from the medial module along respective specified non-anatomical interfaces.

Example 19 can include, or can be combined with any one of Examples 1-18 to include subject matter (such as a method, a means for performing acts, or a machine-readable medium including instructions that, when performed by the machine, cause the machine to perform acts) that can include using an anatomical model for demonstrating, practicing, or evaluating a human pelvic examination, medical, or surgical procedure or technique, the model comprising: a pelvic region structure, comprising three-dimensional (3D) anatomical representations of a pubic bone, a sacrum, a coccyx, and at least one of an ischium or an ilium; and a user-removable body component module, comprising a 3D anatomical representation of at least one of a human organ, gland, muscle group, nerve, vessel, ligament, tendon, connective tissue, or skin, the body component module configured to be directly or indirectly engaged in substantially correct anatomical relation to the pelvic region structure, the method comprising: allowing a user to perform the human pelvic examination, medical, or surgical procedure or technique; and replacing the body component module after the user has performed the human pelvic examination, medical, or surgical procedure or technique.

In Example 20, the subject matter of any one of Examples 1-19 can optionally include providing a fluid to the anatomical model.

These and other examples, advantages, and features of the present apparatus, methods and kits will be set forth in part in following Detailed Description. This overview is intended to provide an overview of the subject matter of the present patent application. It is not intended to provide an exclusive or exhaustive explanation of the invention. The detailed description is included to provide further information about the present apparatus, methods and kits.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed herein.

DETAILED DESCRIPTION

Parts List

Reference Number—Part

Figure 1:
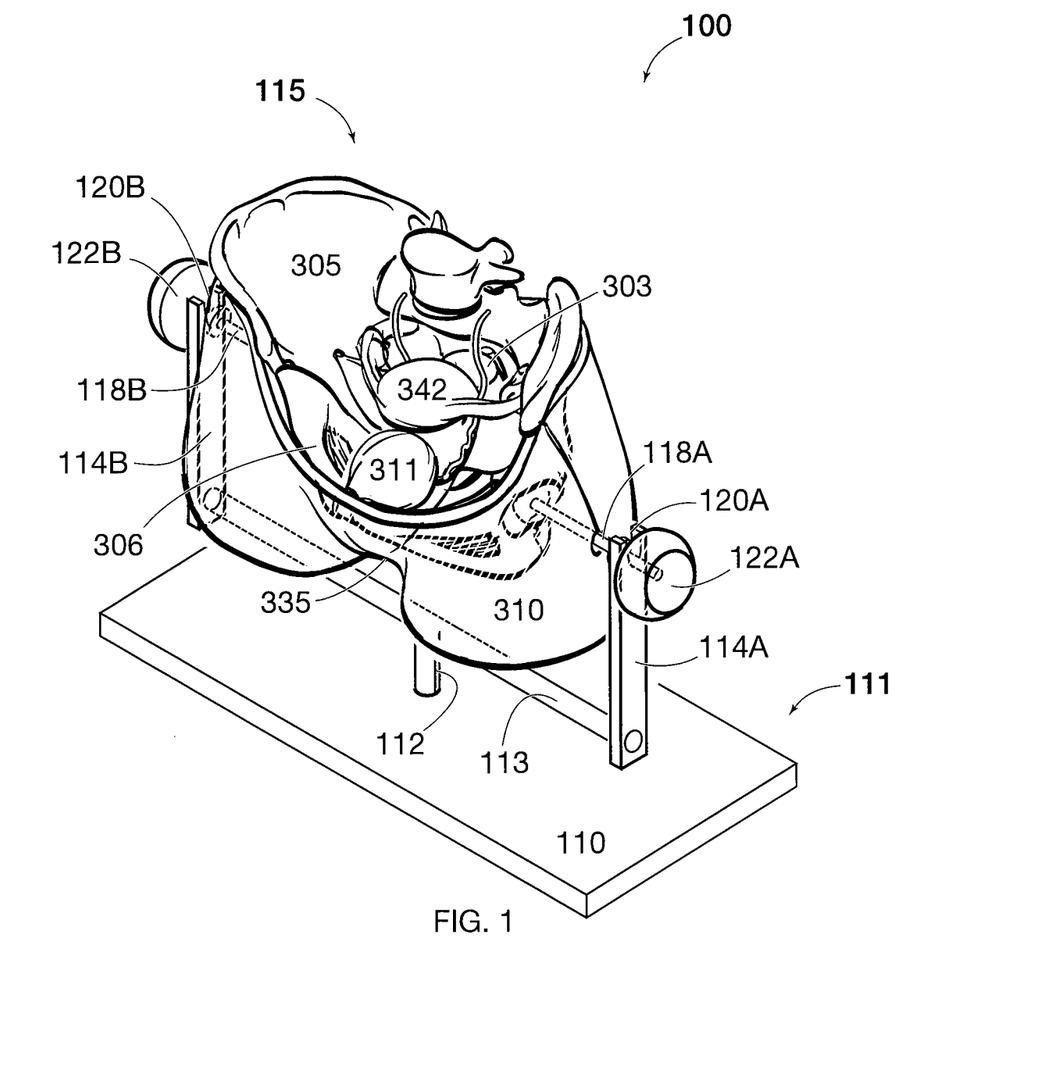
FIG. 1 illustrates an example of portions of a human pelvic region anatomical model.

100—Pelvic Region Anatomical Model
110—Base
111—Stand
112—Post
113—Crossbar
114A-B—Uprights
115—Pelvic Region Structure
118A-B—Mounts
120A-B—Receptacles
122A-B—Handles
301—Pin
302—Receptacle
303—Rectum
304—Posterior Module
305—Medial Module
306—Anterior Module
307—Obturator Body Component Module
308—Sacrospinous Ligament Body Component Module
310—Skin Shell
311—Urinary Bladder
313—Sliding Lock
314—Sliding Lock Groove
321—Sliding Lock
326—Sliding Lock Groove
330A-B—Slits
335—Vulva
331A-B—Passages
340—Vagina
341—Uterine Module
342—Uterus
344A-B—Sliding Locks
345A-B—Sliding Lock Grooves
346A-B—Fallopian Tubes
347A-B—Ovaries
348—Cervix
349A-B—Uterine Arteries
353—Rectal Module
361—Urinary Bladder Module
402—Bladder Lumen
405—Uterine Lumen
407—Anterior Cul de Sac
408—Posterior Cul de Sac
410—Rectal Lumen
412—Anal Dimple FIG. 1 illustrates an example of portions of a human pelvic region anatomical model 100. The pelvic region anatomical model 100 can include or be coupled to a stand 111. In an example, the stand 111 can include a flat or other base 110, a vertical post 112 that can extend upward from the base 110, a crossbar 113 that can extend horizontally in opposite directions from the top of the post 112, vertical upright posts ("or uprights") 114A-B that can extend upward from respective ends of the crossbar 113. In an example, the pelvic region anatomical model 100 can include a three-dimensional (3D) representation of pelvic region structure 115, such as can be mounted or otherwise located above the crossbar 113 and between the uprights 114A-B. In an example, spindles or other mounts 118A-B can be provided, such as to couple the pelvic region structure 115 to the uprights 114A-B or other structure associated with the stand 111. For example, the spindles or other mounts 118A-B can extend horizontally outward from opposing lateral sides of the pelvic region structure 115 to the respective uprights 114A-B, such as to allow forward and backward pivoting of the pelvic region structure 115, such as to permit a viewer located in front of the anatomical model 100 to view the pelvic region structure 115 from a top view, a front view, a bottom view, or a rear view, as desired by the user. In an example, upper distal ends of the uprights 114A-B can include a pivot coupling to the respective mounts 118A-B, such as by receiving the spindles or other mounts 118A-B in respective circular, U-shaped, or other receptacles 120A-B. Knobs or other handles 122A-B can be located at the distal ends of the spindles or other mounts 118A-B, such as to permit grasping by a user, such as during the pivoting of the pelvic region structure 115. The knobs or other handles 122A-B (or the receptacles 120A-B) can include a locking feature, such as to permit the pelvic region structure 115 to be locked into a particular rotational position, such as can be selected from one or several pre-specified or arbitrarily user-selected positions along the rotational range of pivoting motion. Rotating the pelvic region structure 115 can be helpful for teaching or other demonstrative purposes, such as to allow viewing or video capture of internal anatomy of the pelvic region structure 115 from an open top surface, or to allow the pelvic region structure 115 to be placed in a horizontal orientation as may be representative of positioning during an actual live human pelvic examination, medical, or surgical procedure or technique. In an example, the model 100 can include or be coupled to a video camera, such as can be mounted to the open top surface of the pelvic region structure 115 to allow video capture of a surgical or other medical procedure or examination.

Figure 2A:
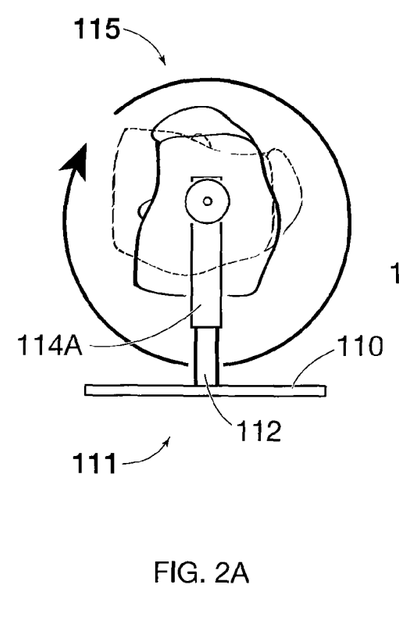
FIG. 2A is a side view of an example of the anatomical model with a stand and a pelvic region structure.

FIG. 2A is a side view of an example of the anatomical model 100 with the stand 111 and the pelvic region structure 115. FIG. 2A illustrates an example of an ability to rotate the pelvic region structure 115 with respect to the stand 111, such as forward or backward. In an example, such rotation can provide a full 360 degree range of rotational pivoting motion. If desired, a more limited subrange can be provided, such as by providing one or more stops (e.g., on the mounts 118A-B, the receptacles 120A-B, the handles 122A-B, or a combination thereof) that can be sized, shaped, or located for limiting the rotational range of motion. In an example, a locking device (e.g., a clamp, a ratchet, a pin, or other locking mechanism) can be provided, such as to permit the user to lock or unlock the rotational position of the pelvic region structure 115, so as to allow viewing or video capture of the internal anatomy of the pelvic region structure 115 from an open top surface thereof, if desired.

Figure 2B:
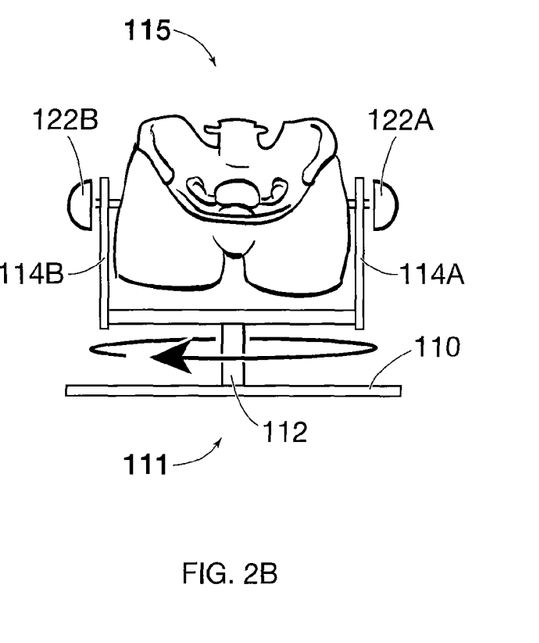
FIG. 2B is a front view of an example of the anatomical model with the stand and the pelvic region structure.

FIG. 2B is a front view of an example of the anatomical model 100 with the stand 111 and the pelvic region structure 115. FIG. 2B illustrates an example of the ability to rotate the pelvic region structure 115 with respect to the stand 111, such as about a vertical axis, such as the axis provided by the vertical post 112. Such rotation can provide a full 360 degree range of rotational pivoting motion about a vertical axis, if desired, or a more limited subrange, if desired, such as by providing one or more stops (e.g., on the vertical post 112, the base 110, or a combination thereof) that can be sized, shaped, or located for limiting the rotational range of motion about the vertical axis. In an example, a locking device (e.g., a clamp, a ratchet, a pin, or other locking mechanism) can be provided, such as to permit the user to lock or unlock the rotational position of the pelvic region structure 115 about the vertical axis.

Figure 3:
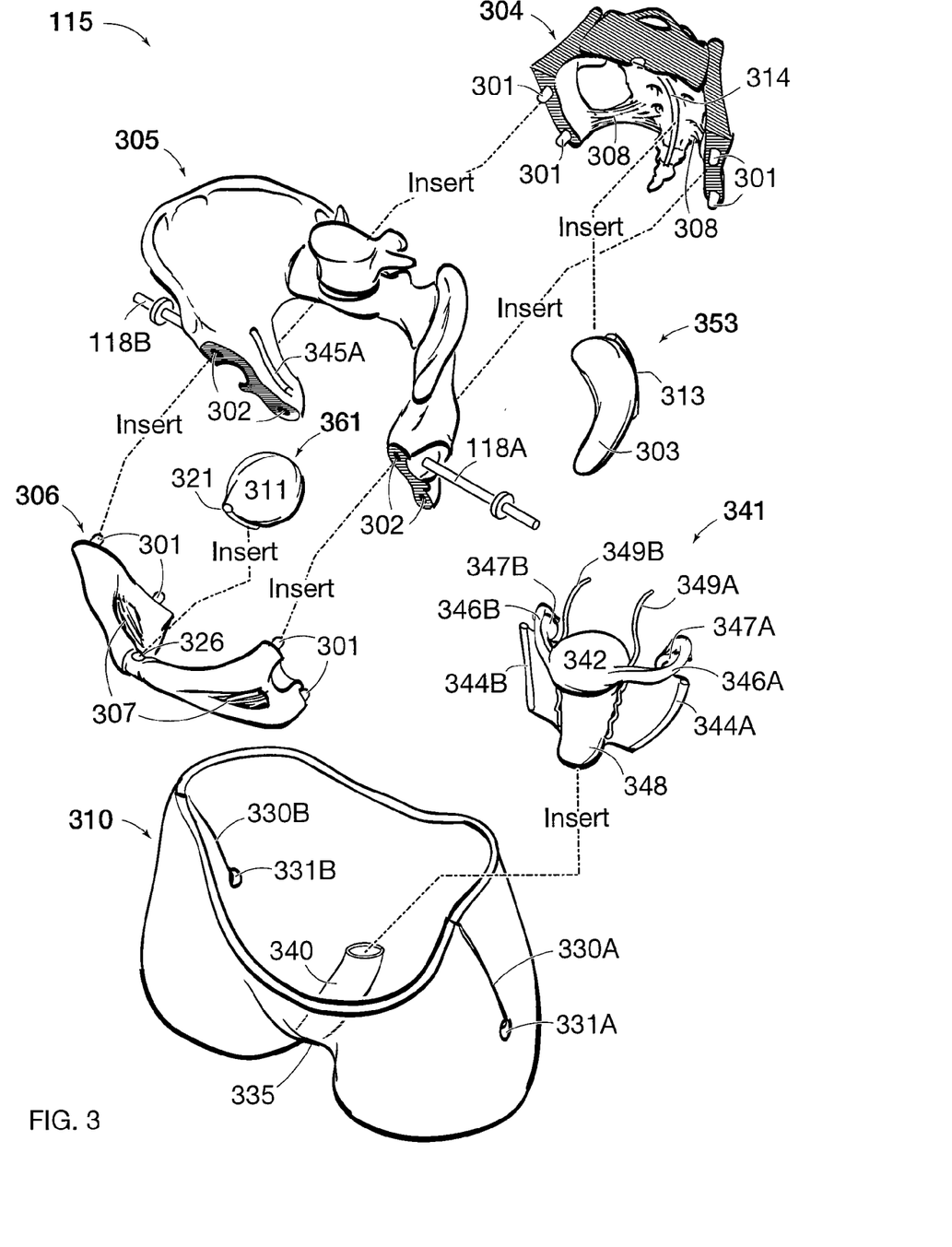
FIG. 3 is an exploded view of an example of portions of the anatomical model.

FIG. 3 is an exploded view of an example of portions of the anatomical model 100. In this example, the pelvic region structure 115 can include or consist of multiple user-replaceable modular sections, which can be referred to as cartridges or modules. The modular sections can be configured to allow an end-user to assemble the modular sections together, or to disassemble the modular sections. In an example, the user-replaceable modular sections can include an anterior module 306, a medial module 305, and a posterior module 304. These or other modules can be fitted together as a group into an assembly, such as to provide portions of the pelvic region structure 115. These modular sections need not be fitted together at a natural anatomical boundary, such as a joint, or the like. Instead, in an example, a joint or boundary between the modules can be arbitrarily formed, such as by a planar cut, an interlocking cut, or the like. This can help provide stability. Mating snap-together components, such as a pin and receptacle, can be provided to hold these modules together. Other affixation techniques can additionally or alternatively be used to hold these modules together, such as to allow user-assembly or user disassembly, such as hook and loop fabric (e.g., VELCRO®), clips, or the like.

In an example, the anterior module 306 can include male snap-on pins 301 that can be inserted and snap-fitted into corresponding mating receptacles 302 in a front of the medial module 305, such as when planar sides of the anterior module 306 are pressed against corresponding planar sides of the medial module 305, or vice-versa. In an example, the posterior module 304 can include male snap-on pins 301 that can be inserted and snap-fitted into corresponding mating receptacles 302 in a rear of the medial module 305, such as when planar sides of the posterior module 304 are pressed against corresponding planar sides of the medial module 305, or vice-versa.

Thus, as shown in FIG. 3, the anatomical model 100 can include portions of a skeletal frame that can provide a substantially realistic representation of the human pelvic girdle that can be uniquely partitioned into multiple (e.g., three) modular segments or sections. The modules can include one or more anatomical landmarks (e.g., normal, pathologic, during pregnancy) that can be useful in surgery, such as to identify one or more appropriate surgical sites. In an example, each such pelvic section (such as the anterior module 306, the medial module 305, and the posterior module 304) can be user-replaceable, and can be attachable to or removable from one or both of the other pelvic section modules, such as by the user.

In an example (such as also shown in the detailed frontal view example of FIG. 5B), the anterior module 306 can include an anterior pelvic section that can include a 3D representation of the pubic symphysis and the right and left pubic rami bone complex (e.g., superior and inferior pubic rami). In an example, the anterior module 306 of the pelvic region structure 115 can include a 3D representation of an obturator foramen. In an example, one or more user-attachable, user-detachable, or user-replaceable 3D obturator body component modules 307, such as representing one or more obturator membranes or one or more obturator muscles, can span across a portion of the 3D representation of the obturator foramen. In an example, one or more such 3D obturator body component modules 307 can be removably attached to their respective attachment sites about the 3D representation of the obturator foramen, such as by using snap-together fittings, or other coupling technique.

In an example, the medial module 305 can include a medial pelvic skeletal section that can include one or any combination of 3D representations of the iliac crest, ischial tuberosity, the upper sacrum comprising sacral ala, sacral promontory, sacroiliac joint, the first sacral vertebrae, the fourth lumbar vertebrae, and the fifth lumbar vertebrae.

Figure 5A:
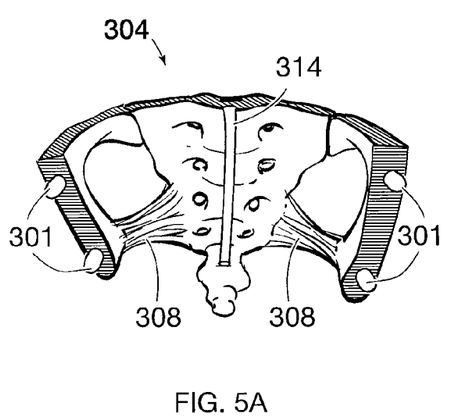
FIG. 5A is a frontal view of an example of the posterior module of the pelvic region structure.
Figure 5B:
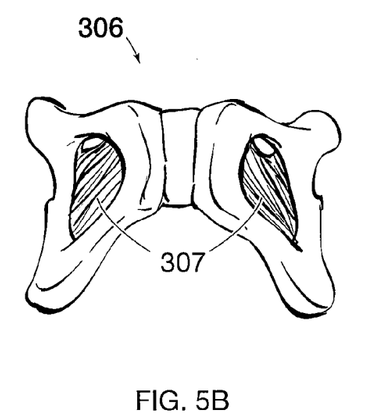
FIG. 5B is a frontal view of an example of the anterior module of the pelvic region structure.

In an example, the posterior module 304 can include one or any combination of 3D representations of an ischial spine, a second sacral vertebrae, a third sacral vertebrae, a fourth sacral vertebrae, a fifth sacral vertebrae, and a coccyx. In an example (such as shown in FIG. 5A), the posterior module 304 can include or be affixed to one or more sacrospinous ligament modules 308. The sacrospinous ligament module 308 can include a 3D representation of one or more sacrospinous ligaments. In an example, the sacrospinous ligament module 308 can be user-attached or user-detached from the posterior module 304. In an example, the sacrospinous ligament module 308 can extend between a 3D representation of lower sacrum (e.g., sacral vertebrae 3-5) of the posterior module 304 and a 3D representation of the ischial spine of the posterior module 304, such as shown in the more detailed frontal view example of FIG. 5A.

In an example, a urinary bladder module 361 can be provided, such as for inclusion in the pelvic region structure 115. The bladder module 361 can include a 3D representation of a urinary bladder 311, which can be sized, shaped, textured, or even fluid-filled to simulate an actual human urinary bladder as would be encountered during surgery or another medical procedure. In an example, the bladder module 361 can be user-attachable or user detachable to one or more of the other components (e.g., the anterior module 306, the medial module 305, or the posterior module 304), such that the 3D representation of the bladder 311 provided by the bladder module 361 will be spaced in substantially correct anatomical relation to the other 3D representations of anatomical features provided by the 3D representation of the pelvic region structure 115. For example, as shown in FIG. 3, the bladder module 361 can include a convex sliding lock 321 that can slide into and engage a mating concave receptacle, such as the sliding lock groove 326 on the anterior module 306), or vice-versa. When the bladder module 361 has been slid into place via the sliding lock 321 and the sliding lock groove 326, the 3D representation of the bladder 311 will be spaced in substantially correct anatomical relation to the other 3D representations of anatomical features provided by the 3D representation of the pelvic region structure 115.

In an example, the bladder module 361 can include or be coupled to a 3D anatomical representation of a urethra, which can be spaced in substantially correct anatomic relation to the other 3D representations of anatomical features provided by the 3D representation of the pelvic region structure 115. In an example, the 3D representation of the urethra can optionally include a tube that can be configured to carry a fluid, such as to simulate urine. The tube can include or be coupled to one or more valves, such as to allow fluid to be loaded into, retained by, or discharged from the 3D representation of the urethra.

In an example, the bladder module 361 can include or be coupled to a 3D anatomical representation of one or both ureters, which can be spaced in substantially correct anatomic relation to the other 3D representations of anatomical features provided by the 3D representation of the pelvic region structure 115. In an example, a 3D representation of the ureter can optionally include a tube that can be configured to carry a fluid, such as to simulate urine. The tube can include or be coupled to one or more valves, such as to allow fluid to be loaded into, retained by, or discharged from the 3D representation of the ureter.

Figure 4A:
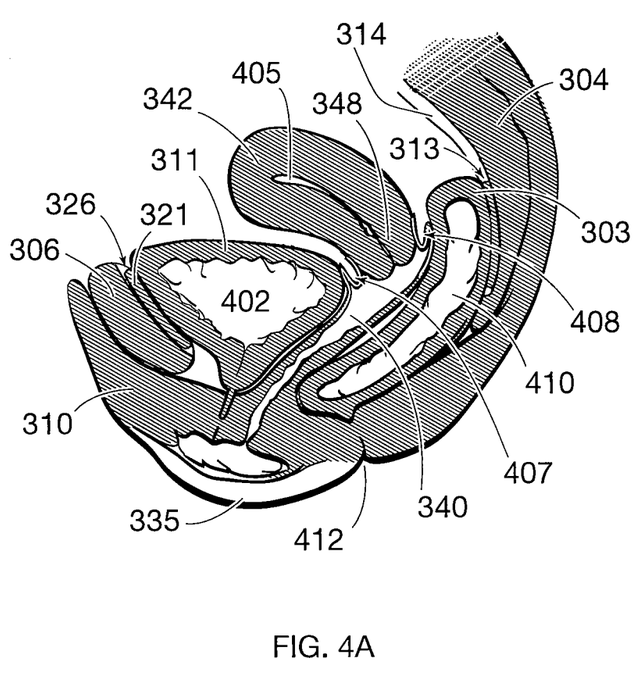
FIG. 4A is a cross-sectional side view of an example of portions of the model, including portion of an example of the pelvic region structure.

In an example, a rectal module 353 can be provided, such as for inclusion in the pelvic region structure 115. The rectal module 353 can include a 3D representation of a rectum 303, which can be sized, shaped, textured, or even filled with a substance to simulate an actual human rectum as would be encountered during surgery or another medical procedure. In an example, the rectal module 353 can be user-attachable or user detachable to one or more of the other components (e.g., the anterior module 306, the medial module 305, or the posterior module 304), such that the 3D representation of the rectum 303 provided by the rectal module 353 will be spaced in substantially correct anatomical relation to the other 3D representations of anatomical features provided by the 3D representation of the pelvic region structure 115. For example, as shown in FIG. 3, the rectal module 353 can include a convex sliding lock 313 that can slide into and engage a mating convex receptacle, such as the sliding lock groove 314 on the posterior module 304), or vice-versa. When the rectal module 353 has been slid into place via the sliding lock 313 and the sliding lock groove 314, the 3D representation of the rectum 303 will be spaced in substantially correct anatomical relation to the other 3D representations of anatomical features provided by the 3D representation of the pelvic region structure 115. In an example (as shown in FIG. 4A), the rectal module may have an interior reservoir or cavity 410.

In an example, the pelvic region structure 115 can include a 3D simulated skin shell 310, which can be sized, shaped, textured, or the like to simulate actual human skin, muscle, fat, or other like tissue of the pelvic region, such as would be encountered during surgery or another medical procedure. In an example the skin shell 310 can be sized and shaped to fit about the assembly of the anterior module 306, the medial module 305, and the posterior module 304, which assembly can include other modular or other body components, such as the bladder module 361 or the rectal module 353, or other modules, such as for providing 3D anatomical representations of other body components.

In an example, the skin shell 310 can be configured to accommodate (e.g., pass through) the mounts 118A-B, such as when the anterior module 306, the medial module 305, and the posterior module 304 are located within the skin shell 310. In an example, the skin shell 310 can include slits 330A-B (e.g., extending downward from the open top of the pelvic region structure 115). In an example, the slits 330A-B can terminate at or otherwise provide passages 331A-B that can be sized and shaped to accommodate passage through by the mounts 118A-B. This can allow the end-user to conveniently slip the skin shell 310 onto or off from the more interior components of the pelvic region structure 115 (e.g., the assembly of the anterior module 306, the medial module 305, and the posterior module 304). In an example, the slits 330A-B can be zippered, snapped together, or otherwise respectively provided with a hook, clasp, or other device for holding the slit closed, such as when the skin shell 310 is in place such that the mounts 118A-B extend through the passages 331A-B in the skin shell 310.

In an example, the skin shell 310 can include a 3D anatomical representation of a vulva 335, such as in a substantially correct size, shape, or anatomical relation to other 3D representations of human body components of the pelvic region structure 115. A 3D anatomical representation of a vagina 340 can extend from the 3D representation of the vulva 335, such as in a substantially correct size, shape, or anatomical relation to other 3D representations of human body components of the pelvic region structure 115.

In an example, a uterine module 341 can be provided, such as for inclusion in the pelvic region structure 115. The uterine module 341 can include a 3D anatomical representation of a uterus 342, which can be sized, shaped, or located to simulate an actual human uterus as would be encountered during surgery or another medical procedure. In an example, the uterine module 341 can include a 3D anatomical representation of fallopian tubes 346A-B. In an example, the uterine module 341 can include a 3D anatomical representation of ovaries 347A-B. In an example, the uterine module 341 can include 3D anatomical representations of one or both uterine arteries 349A-B. In an example, the 3D representation of the uterine arteries 349A-B can include a tube that can be configured to carry a fluid (e.g., colored water, colored mineral oil, or other suitable fluid), such as to simulate blood. In an example, the tube can include or be coupled to one or more valves, such as to allow fluid to be loaded into, retained by, or discharged from the 3D representation of the uterine arteries 349A-B.

In an example, the uterine module 341 can be user-attachable or user detachable to one or more of the other components (e.g., the anterior module 306, the medial module 305, or the posterior module 304), such that the 3D representation of the uterus 342 provided by the uterine module 341 will be spaced in substantially correct anatomical relation to the other 3D representations of anatomical features provided by the 3D representation of the pelvic region structure 115. For example, as shown in FIG. 3, the uterine module 341 can include one or more convex sliding locks 344A-B, such as that can respectively slide into and engage a respective mating receptacle, such as the concave sliding lock grooves 345A-B on opposing interior-facing sides of the medial module 305), or vice-versa. When the uterine module 341 has been slid into place via the sliding locks 344A-B and the sliding lock grooves 345A-B, its 3D representations of anatomical features will be spaced in substantially correct anatomical relation to the other 3D representations of anatomical features provided by the 3D representation of the pelvic region structure 115.

In an example, when the uterine module 341 is slid into place via the sliding locks 344A-B and the sliding lock grooves 345A-B, a 3D anatomical representation of a cervix 348 portion of the 3D representation of the uterus 345 is positioned such that when the skin shell 310 is then placed over the assembly of the anterior module 306, the medial module 305, and the posterior module 304, the 3D representation of the vagina 340 extends upward to receive (inserted in a substantially anatomically correct position therein) the 3D anatomical representation of the cervix 348.

Figure 4B:
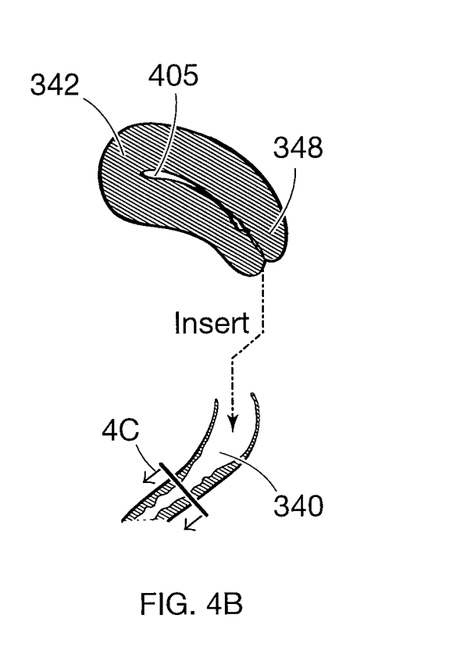
FIG. 4B is a cross-sectional side view of an example of portions of the model, including portions of a uterine module providing a 3D representation of a uterus, and portions of a 3D representation of a vagina.

FIG. 4A is a cross-sectional side view of an example of portions of the model 100, including portion of an example of the pelvic region structure 115. FIG. 4 illustrates, among other things, a cross-sectional view of 3D representations of portions of the skin shell 310, the vulva 335, the vagina 340, the rectum 303, the back of the pelvis provided by the posterior module 304, the uterus 342 (which can optionally include an interior cavity or lumen 405), the bladder 311 (which can optionally include an interior reservoir 402, including one or more ports and valves such as for retaining fluid such as for simulating urine retention by the bladder), the sliding lock 321 of the bladder module 361, and the front of the pelvis provided by the anterior module 306. FIG. 4B illustrates, among other things, how the cervical portion of the 3D representation of the uterus 342 is inserted into a distal end of the 3D representation of the vagina 340. In an example, the uterus or the uterine lumen may be configured to simulate one or more pathological conditions, such as fibroids, tumors or other malignancies, or prolapse.

In an example, the bladder 311 or its internal reservoir 402 can be configured to simulate one or more pathological conditions, such as diverticula, bladder extroversion, carrying one or more bladder stones, or the like.

As described above, the bladder module 361, the rectal module 353, and the uterine module 341 are examples of body component model modules providing 3D anatomical representations. Such modules can be installed into or removed from the model 100 by a user, for example, to allow re-use of portions of the model 100 after a particular modular body component model has been replaced, such as after a simulated surgical or other medical procedure. These body component model modules are provided by way of illustrative example, and not by way of limitation. Other modular body component models can additionally or alternatively be included with the model 100, such as in a kit form. In an example, the kit can optionally include components other than the pelvic model, such as instructions or materials for performing a simulated medical or surgical examination or procedure using the model. Some illustrative non-limiting examples of such other materials that can be included in the kit are sutures, needles, or the like. For example, elastomer materials or sutures can be provided in the kit, such as to aid in understanding how to repair an injury to a body component.

In an example, a body component model module can include a representative model of one or a combination of one or more: organs, muscles or muscle groups, blood or other vessels, nerves, ligaments, tendons, connective tissue or skin. Some examples can include, by way of illustrative example and not by way of limitation, one or more of (or any combination of) an inguinal ligament, a sacrospinous ligament, a sacrotuberous ligament, an anterior sacroiliac ligament, superior or inferior iliolumbar ligament, a lumbrosacral ligament, an anterior longitudinal ligament, a supraspinal ligament, a short posterior sacroiliac ligament, a long posterior sacroiliac ligament, a superficial posterior sacrococcygeal ligament, an interosseous sacroiliac ligament, an obturator ligament (membrane), a ligament of the pubic arch, an arcus tendinous fascia or tendinous arch or white line of the pelvic fascia, a pubovesical ligament, a puboprostatic ligament, a suspensory ligament of a penis, a broad ligament, a round ligament of a uterus, an ovarium ligament, an anal sphincter, a rectum, an external urethral sphincter, a ureter, a bladder, an anterior or posterior cul de sac, a prostate, a prostatic urethra or urethral orifice, a bulbourethral gland, a penis, a glans penis, a trigone vesicae, a seminal vesicle, a vas deferens, an epididymus, a testicle, a tunica vaginalis, a spermatic cord (e.g., with artery vein or testicular nerve), a uterus, a cervix, a vagina and vaginal orifice, a clitoris, a glans clitoris, a fallopian tube, an ovary, a labia major or minor, an obturator internus, an iliacus, a psoas major, a psoas minor, a quadratus lumborum, transverses abdominis (with fascia transversa), a pubococcygeus, an iliococcyygeus, a coccygeus, a puborectalis, a piriformis, a sartorius, a rectus femoris, a pectineus, an adductor longus, a tensor fascia lata, a gluteus media, a descending (abdominal) aorta, a common iliac artery, a common iliac vein, an external iliac artery, an external iliac vein, an internal iliac (hypogastric) artery, an internal iliac vein, an iliolumbar artery, a lateral sacral artery, an inferior epigastric artery, an inferior epigastric vein, an inferior vena cava, a superior gluteal artery, a superior vesical artery, an inferior vesical artery, an obturator artery, a rectal artery, an umbilical artery, one or more uterine or vaginal arteries or veins, a testicular artery (e.g., internal spermatic artery or vein), a common pudendial nerve, an internal pudendal nerve (nervus perinaei), a nerve dorsalis penis, an inferior scrotal nerves, an inferior gluteal nerve, a subcutaneous perinaei nerve, a sacral or pudendal plexus, a rectal nervers, a sympathetic nerve of the lumbar, a spermatic plexus, an ovarian plexus, a hypogastric plexus, a pelvic plexus, a uterine plexus, a vaginal plexus, a prostatic plexus and vesicle plexus, a peritoneum, an omentum, or a subcutaneous layer of skin or the dermis or epidermis.

A body component model module representing human skin (e.g., epidermal, dermal and subcutaneous layers and fascia), such as the skin shell 310, can be formed of a soft, silicon-based elastic polymer. The skin model can vary in thickness at one or more locations of the skin shell 310, such as to simulate differences in living tissue or to permit manual palpation of one or more anatomical landmarks in the pelvic anatomical model 100. The skin shell 310 of the pelvic anatomical model 100 can be replaceable, for example, such as to permit it to be removably attachable by an end-user. In an example, the skin shell 310 can be attached to underlying portions of the pelvic anatomical model 100 by a snug conformable elastic fit, without requiring any further attachment device. In an example, the skin shell 310 can additionally or alternatively be held in place using one or more other techniques, such as by one or any combination of snaps, tape, zippers, clasps, hook and eye fabric such as VELCRO®, or other end-user manipulable attachment means or technique.

A body component model module can be configured in relation to one or more other body component modules, such as to simulate various cavities, pouches or defined spaces within a human pelvis region. Examples can include anterior or posterior peritoneal cul de sacs, a retopubic space, a retrovesical space, a presacral space, a rectouterine space, or pouch of Douglas. In an example, such as using the skin shell 310 and the uterine module 341, a body component model can include a 3D representation of a vagina 340 and a 3D representation of a cervix 348, in which a distal portion of the vagina 340 can be configured so as to fold over itself where it receives and engages the 3D representation of the cervix 348, such as shown in the cross-sectional view of FIG. 4A. Such folding can help simulate the anterior and posterior peritoneal cul de sacs (respectively, 407 and 408), which can be important anatomical landmarks in female pelvic examination or surgery.

Figure 4C:
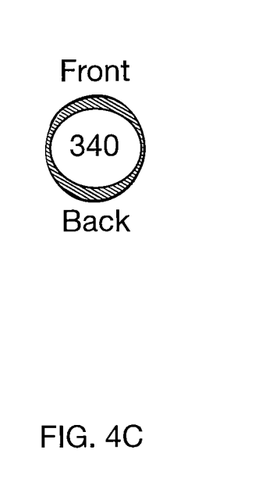
FIG. 4C is a cross-sectional view taken along the cut-line 4C-4C shown in FIG. 4B.

In an example, a female pelvic anatomical model 100 can comprise a pelvic skeletal frame, with body component models including, by way of example and not by way of limitation, 3D anatomical representations of one or any combination or all of: a uterus with anterior and posterior uterine flaps, a vagina, fallopian tubes, ovaries, a bladder, a urethra, a rectum, an obturator and other muscles, sacrospinous ligaments, sacrotuberous ligaments, inguinal ligaments, broad ligaments and other ligaments associated with female reproductive organs, anterior and posterior peritoneal cul de sacs, arteries and veins, and skin covering the pelvic anatomical model and configured to model the female external genitalia. In an example of a female pelvic anatomical model, the simulated skin can form a hollow tube that can be sized and shaped to anatomically represent a vagina. In an example, the 3D representation of the vagina can have a vaginal wall thickness of 2-3 millimeters. In an example, as shown in FIGS. 4A and 4C, the skin shell forming the vagina may be of varying thickness to more realistically represent the vaginal structure. In an example, the 3D representation of the vaginal wall can be thinner at a distal internal vaginal opening where the 3D representation of the vagina will connect to the 3D representation of the cervix.

In an example, the genital hiatus and width of the external vaginal opening and the urethra opening can be provided or varied, such as to simulate anatomical differences in actual live humans, and thereby affecting the difficulty of a medical or surgical procedure. This can help allow assessment of physician skill in performing various medical or surgical procedures when such varying anatomical differences are present. This can be useful, for example, in evaluating and credentialing physicians.

In an example, the model 100 can include a male pelvic anatomical model, such as can include a pelvic skeletal frame, with body component model modules that can include, by way of example and not by way of limitation, 3D representations of one or any combination or all of a bladder, a urethra, a prostate, a prostatic urethra or urethral orifice, a bulbourethral gland, a penis, a glans penis, a trigone vesicae, a seminal vesicle, a vas deferens, an epididymus, a testicle, a rectum, an obturator membrane or one or more obturator muscles, one or more sacrospinous ligaments, one or more sacrotuberous ligaments, one or more inguinal ligaments, a sacrum, one or more arteries or veins, and skin covering the pelvic anatomical model and configured to model the male external genitalia.

The 3D representation models of one or any combination of the organs, nerves, muscles, ligaments, vessels and other body components can be tinted in a color corresponding to the natural (normal or pathological) color of the live tissue represented by such a body component model.

In an example, the body component model can be formed in one or more layers of elastomer, such as of differing thickness or density, such as to simulate one or more superficial features, subcutaneous layers, or membranes to mimic human skin.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventor also contemplates examples in which only those elements shown and described are provided, as well as examples in which all those elements shown and described are provided. Moreover, the present inventor also contemplates examples using any combination or permutation of those elements shown or described, either with respect to a particular example, or with respect to other examples shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The claimed invention is:

1. An anatomical model comprising:
   a skeletal structure, the skeletal structure comprising a representation of at least part of a human pelvic girdle, the skeletal structure defining a plurality of receptacles for directly attaching detachable abdominopelvic region components; and
   a plurality of detachable abdominopelvic region components, each of the plurality of detachable abdominopelvic region components configured to be directly releasably attachable to a respective receptacle in the plurality of receptacles defined by the skeletal structure,
   wherein the skeletal structure and the plurality of detachable abdominopelvic region components, when attached, are configured to provide a realistic operating experience for a vaginal hysterectomy; and a stand, the skeletal structure configured to be directly releasably attachable to the stand, wherein the stand, when the skeletal structure is attached to the stand, provides at least one of horizontal rotation of the skeletal structure or vertical rotation of the skeletal structure relative to the stand; wherein the stand comprises: a base; a vertical post comprising a top vertical post end and a bottom vertical post end opposite the top vertical post end, the bottom vertical post end connected to the base at approximately a center of the base, the vertical post extending upward from the base; a crossbar comprising a left crossbar end and a right crossbar end opposite the left crossbar end, the crossbar connected to the top vertical post end at a location between the left crossbar end and the right crossbar end, the left crossbar end and the right crossbar end extending horizontally in opposite directions from the vertical post; a first upright comprising a top first upright end and a bottom first upright end opposite the top first upright end, the first upright defining a first receptacle for receiving the skeletal structure, the bottom first upright end connected to the left crossbar end, the first upright extending upward from the crossbar; and a second upright comprising a top second upright end and a bottom second upright end opposite the top second upright end, the second upright defining a second receptacle for receiving the skeletal structure, the bottom second upright end connected to the right crossbar end, the second upright extending upward from the crossbar in a same direction as the first upright.

2. The anatomical model of claim 1, wherein the skeletal structure defines a plurality of anatomical landmarks, the plurality of anatomical landmarks comprising an obturator foramen, an ischial tuberosity, an ischial spine, a coccyx, an inferior pubic ramus, and a superior pubic ramus.

3. The anatomical model of claim 2, wherein the plurality of anatomical landmarks further comprise an ischium, an ilium, an iliac crest, a sacral vertebrae, a sacrum, a pubic symphysis, an anterior cul de sac, a posterior cul de sac, and an arcus tendinous fascia.

4. The anatomical model of claim 2, wherein the plurality of detachable abdominopelvic region components comprises:
a uterine module, the uterine module defining a uterus, an ovary, and a fallopian tube, the uterus comprising a cervix, wherein the uterine module comprises a uterine sliding lock and the plurality of receptacles defined by the skeletal structure comprises a mating uterine sliding lock groove for receiving the uterine sliding lock to directly attach the uterine module to the skeletal structure; and
a vagina module, the vagina module defining a vaginal opening and a vagina comprising a vaginal wall, the vaginal wall defining an internal vaginal opening configured to receive the cervix.

5. The anatomical model of claim 4, wherein the plurality of detachable abdominopelvic region components comprises:
a bladder module, the bladder module defining a bladder, wherein the bladder module comprises a bladder sliding lock and the plurality of receptacles defined by the skeletal structure comprises a mating bladder sliding lock groove for receiving the bladder sliding lock to directly attach the bladder module to the skeletal structure.

6. The anatomical model of claim 5, wherein the plurality of detachable abdominopelvic region components comprises:
a sacrospinous ligament module, the sacrospinous ligament module defining a sacrospinous ligament, the sacrospinous ligament module attachable to and detachable from the skeletal structure, wherein the sacrospinous ligament module, when attached, extends between a lower sacrum of the skeletal structure and an ischial spine of the skeletal structure; and
an obturator module, the obturator module comprising an obturator membrane, an obturator muscle, and an obturator snap fitting,
wherein the skeletal structure defines an obturator foramen and the plurality of receptacles defined by the skeletal structure comprises a mating obturator snap fitting on the obturator foramen for receiving the obturator snap fitting to directly attach the obturator module to the skeletal structure.

7. The anatomical model of claim 6, wherein the skeletal structure and the plurality of detachable abdominopelvic region components, when attached, are further configured to provide the realistic operating experience for a bilateral salpingo-oophorectomy, a retropubic urethral sling procedure, a transobuturator urethral sling procedure, a vaginal sacrpcolpopexy, a single incision mid-urethral sling procedure, a vaginal injury repair, a cervical injury repair, a uterine injury repair, a bladder injury repair, a sacrospinous ligament suspension, and a rectal injury repair.

8. The anatomical model of claim 4, wherein the uterine module is configured to simulate a pathological condition.

9. The anatomical model of claim 4, wherein the vaginal wall comprises a varying thickness between approximately two millimeters and approximately three millimeters, and wherein the vaginal wall surrounding the internal vaginal opening is thinner than the vaginal wall at the vaginal opening.

10. The anatomical model of claim 1, wherein the realistic operating experience comprises each of the plurality of detachable abdominopelvic region components, when attached, being in a respective anatomically accurate position relative to the skeletal structure.

11. The anatomical model of claim 10, wherein the realistic operating experience further comprises each of the plurality of detachable abdominopelvic region components comprising an anatomically accurate size, shape, density, weight, and elasticity of at least one of a respective human female organ, tissue, or muscle.

12. The anatomical model of claim 1, wherein the realistic operating experience for the vaginal hysterectomy comprises the anatomical model being configured to allow a surgeon to practice the vaginal hysterectomy from start to finish.

13. The anatomical model of claim 1, wherein the skeletal structure and the plurality of detachable abdominopelvic region components, when attached, provide an open top for viewing the vaginal hysterectomy, wherein the open top provides direct physical access to the skeletal structure and the plurality of detachable abdominopelvic region components via an entire horizontal cross-section opening defined by the skeletal structure and the plurality of detachable abdominopelvic region components when the skeletal structure is in a standing position.

14. The anatomical model of claim 13, wherein none of the detachable abdominopelvic region components is covered by an elastomer when the skeletal structure and the plurality of detachable abdominopelvic region components are attached.

15. The anatomical model of claim 1, wherein the stand, when attached with the skeletal structure, is further configured to allow the skeletal structure to be locked in a Trendelenburg position.

16. The anatomical model of claim 1, wherein a subset of the plurality of detachable abdominopelvic region components is reusable for a second vaginal hysterectomy.

17. The anatomical model of claim 1,
wherein the skeletal structure comprises a first spindle extending horizontally outward from a first lateral side and a second spindle extending horizontally outward from a second lateral side opposite the first lateral side,
wherein the first receptacle is U-shaped and configured to receive the first spindle, and
wherein the second receptacle is U-shaped and configured to receive the second spindle.

18. The anatomical model of claim 1, wherein the skeletal structure, when attached to the stand, is mounted above the crossbar and between the first upright and the second upright.

19. The anatomical model of claim 1, wherein the stand, when the skeletal structure is attached to the stand, provides horizontal rotation and vertical rotation of the skeletal structure relative to the stand.

20. The anatomical model of claim 19, wherein the horizontal rotation comprises a 360 degree horizontal rotational range of the skeletal structure relative to the stand, and wherein the vertical rotation comprises a 360 degree vertical rotational range of the skeletal structure relative to the stand.

21. The anatomical model of claim 19, wherein the stand further comprises a stop, the stop limiting at least one of a horizontal rotational range of the horizontal rotation or a vertical rotational range of the vertical rotation.

22. The anatomical model of claim 1, further comprising:
a handle for locking the skeletal structure in a rotational position,
wherein the handle, when the skeletal structure is attached to the stand, is configured to lock the skeletal position in the rotational position using the handle without moving the base and without moving the vertical post.

23. The anatomical model of claim 1, wherein neither the skeletal structure nor any of the plurality of detachable abdominopelvic region components, when attached, are enclosed by an elastic polymer.

24. The anatomical model of claim 1, wherein configured to provide the realistic operating experience for the vaginal hysterectomy comprises being configured to allow a uterus to be removed through a vagina during a simulated vaginal hysterectomy being performed on the anatomical model in a substantially same manner as a human uterus is removed from a human vagina during a real vaginal hysterectomy.

25. An anatomical model comprising:
a skeletal structure, the skeletal structure defining at least part of a human pelvic girdle;
a uterine module, the uterine module defining a uterus comprising a cervix, wherein the uterine module comprises a means for releasably attaching to the skeletal structure and the skeletal structure comprises a corresponding means for receiving the uterine module;
a module defining a vaginal opening and a vagina comprising a vaginal wall, the vaginal wall defining an internal vaginal opening configured to receive the cervix;
a bladder module, the bladder module defining a bladder, wherein the bladder module comprises a means for releasably attaching to the skeletal structure and the skeletal structure comprises a corresponding means for receiving the bladder module;
a sacrospinous ligament module, the sacrospinous ligament module defining a sacrospinous ligament, wherein the sacrospinous ligament module comprises a means for releasably attaching to the skeletal structure and the skeletal structure comprises a corresponding means for receiving the sacrospinous ligament module; and
an obturator module, the obturator module defining an obturator membrane and an obturator muscle, wherein the obturator module comprises a means for releasably attaching to the skeletal structure and the skeletal structure comprises a corresponding means for receiving the obturator module; and a stand, the skeletal structure configured to be directly releasably attachable to the stand, wherein the stand, when the skeletal structure is attached to the stand, provides at least one of horizontal rotation of the skeletal structure or vertical rotation of the skeletal structure relative to the stand; wherein the stand comprises: a base; a vertical post comprising a top vertical post end and a bottom vertical post end opposite the top vertical post end, the bottom vertical post end connected to the base at approximately a center of the base, the vertical post extending upward from the base; a crossbar comprising a left crossbar end and a right crossbar end opposite the left crossbar end, the crossbar connected to the top vertical post end at a location between the left crossbar end and the right crossbar end, the left crossbar end and the right crossbar end extending horizontally in opposite directions from the vertical post; a first upright comprising a top first upright end and a bottom first upright end opposite the top first upright end, the first upright defining a first receptacle for receiving the skeletal structure, the bottom first upright end connected to the left crossbar end, the first upright extending upward from the crossbar; and a second upright comprising a top second upright end and a bottom second upright end opposite the top second upright end, the second upright defining a second receptacle for receiving the skeletal structure, the bottom second upright end connected to the right crossbar end, the second upright extending upward from the crossbar in a same direction as the first upright.

26. The anatomical model of claim 25, further comprising:
a stand, wherein the stand comprises a means for receiving the skeletal structure and the skeletal structure comprises a corresponding means for releasably attaching to the stand.

27. The anatomical model of claim 26,
wherein the stand further comprises a means for providing horizontal rotation of the skeletal structure and vertical rotation of the skeletal structure when the skeletal structure is attached to the stand, and
wherein the stand further comprises a means for limiting a rotational range of at least one of the horizontal rotation of the skeletal structure or the vertical rotation of the skeletal structure when the skeletal structure is attached to the stand.

* * * * *